UNITED STATES PATENT OFFICE.

CARLETON ELLIS AND LOUIS RABINOVITZ, OF MONTCLAIR, NEW JERSEY, ASSIGNORS, BY MESNE ASSIGNMENTS, OF FOUR-TENTHS TO ELLIS-FOSTER COMPANY, A CORPORATION OF NEW JERSEY, AND SIX-TENTHS TO INDESTRUCTIBLE PAINT COMPANY, LTD., OF LONDON, ENGLAND, A CORPORATION.

PROCESS OF MAKING VARNISH-BASES.

1,226,760.     Specification of Letters Patent.     Patented May 22, 1917.

No Drawing.     Application filed December 29, 1914. Serial No. 879,557.

*To all whom it may concern:*

Be it known that we, CARLETON ELLIS and LOUIS RABINOVITZ, citizens of the United States, and residents of Montclair, in the county of Essex and State of New Jersey, have invented certain new and useful Improvements in Processes of Making Varnish-Bases, of which the following is a specification.

This invention relates to a method of making resin esters and to the product of such process and relates in particular to a method which involves certain improved and simplified operations and enables esters, anhydrids, lactones and the like, in some cases of almost complete neutrality to be prepared.

Rosin and other varnish resins contain a large amount of acid, commonly regarded as abietic and sylvic acids, so that the acid number of colophony is around 140 or 150 and this resin very readily unites with basic bodies, such as white lead and zinc white, so that when rosin is used as a component of grinding varnish the pigment combines with the resin acid and livering results, causing deterioration, if not complete loss of the product. To ameliorate this difficulty to some extent, rosin has been hardened by lime or other alkali which only partly neutralizes the acid. Lime resinate of a more neutral character would be too slightly soluble in the vehicle employed. Lime treatment therefore, does not overcome the difficulty. By esterifying resin with glycerin, or other bodies containing the hydroxyl group, including the alcohols and also even that other class of hydroxylated bodies, the phenols, esters can be obtained which do not react deleteriously with the basic pigment employed. As ordinarily prepared, however, these have the disadvantage of containing a certain amount of free acid, as for example, a commercial sample of rosin ester which was found to exhibit about 18% acidity. Furthermore, the present method of making ester, or ester gum, as it is known to the trade, involves heating under a pressure of several atmospheres, with for example, glycerin, and then distilling by the vacuum process, which involves a series of operations with a plant of a costly character.

By the present invention it is possible to entirely eliminate the operations under pressure and *in vacuo*, although these may be used with the present process, if any advantage under special circumstances is derived by so doing. According to one form of the present invention colophony or various resins such as Kongo, Pontianak, kauri and other similar hard resins or gums may be treated with glycerin, or other equivalent material in the presence of hydrochloric acid gas, or similar gaseous dehydrating agent, preferably without the use of any solvent vehicle. The reaction is usually best carried on by passing the dehydrating gas into direct contact with a molten mixture of the rosin and glycerin. The reaction temperature may be 280–300° C., and the hydrochloric acid which passes through the mass, serves to withdraw the moisture and water produced. Any rosin spirits or other volatile material originally in the resin, or formed by the reactions taking place is collected in a receiver from which the moisture-laden hydrochloric acid gas is withdrawn and cooled in a suitable receptacle. After collection as by absorption in water, or other menstruum, etc., the acid recovered in this manner, may be dried and used again in the operation. While the product is being prepared the reacting mass preferably should be covered, as free contact with the air when the product is highly heated tends to cause darkening or discoloration.

An illustrative example is the following:

I. 50 parts of rosin and 5 to 8 parts by weight of a strong glycerin was heated to 285° C., for two hours, while a current of hydrochloric acid gas was passed through the molten mass. In this way, the acid number of the resulting product was found to be reduced to 1/15 its original value and no hydrochloric acid was detectable in the finished product. The color was approximately that of the original rosin.

Another method of preparation is that of violently agitating the rosin and the glycerin in a chamber through which hydrochloric acid gas is passed. A cylinder having a horizontal paddle wheel, which churns the material into a spray or foam and brings the hydrochloric acid gas into intimate contact with the material may be employed, or other suitable agitating devices may be used. Or the gas may be passed through the resin and glycerin, while these are being agitated by a stirring device.

In a similar manner, though ordinarily at higher temperatures, products derived from harder resins may be prepared, while some of the softer resins such as dammar, sandarac and the like, may also be treated in a like manner. Ordinary rosin may be treated more easily than, for example, Kongo gum, which material is difficult of fusion at moderate temperatures, except in the presence of the rosin which acts as a flux.

After the product has been treated in this manner, it may be heated with hydrated lime, or other material of a basic nature to form some lime resinate from the remaining acid material.

By the action of carbon dioxid on a mixture of rosin and glycerin, a substantial reduction of the acid number is secured, as will be indicated by the following example:

II. 75 parts of rosin and 11 parts by weight of glycerin were heated to 290° C., and a stream of dry carbon dioxid was bubbled through the molten mixture, for a period of one and a quarter hours. The rosin showed a drop in acidity to 18% of the original acidity and the color of the product was very good. The carbon dioxid gas used was dried by passing through concentrated sulfuric acid and over calcium chlorid. In carrying out this operation on a manufacturing scale, the carbon dioxid gas may be circulated through the reacting resinous mass and when withdrawn, is passed through a drying chamber and the like to remove moisture, and any products of distillation if desired, and is then returned to the body of molten resin so as to travel in a cyclic path, removing the moisture from the resin and in turn being freed from the mixture which it has picked up.

III. According to another example 12 parts of rosin and 1.8 parts of glycerin were heated for two and a half hours at 280-300° C., in a closed electrically heated container fitted with a stirrer and through which a stream of dried carbon dioxid was passed. The acid number of the resinous material fell by this treatment to nearly 10% of that of the original resin.

By the action of hydrochloric acid, or other similar or suitable dehydrating material on rosin alone without glycerin, a reduction in the acid number is obtained, due no doubt to the formation of anhydrids, lactones and the like.

IV. For example, a quantity of rosin was heated to about 300° in a closed container for a period of one half hour, while a stream of hydrochloric acid gas was passed through the molten rosin and it was found that the acid number of the rosin was reduced in that time to 23% of that of the original rosin and that the color of the material was excellent.

By another procedure the resinous body may be simply heated to about 300° C. to yield an anhydrid, or similar corresponding product and after this material has been prepared, a quantity of glycerin, or the like, is heated and the mixture esterified by simple heating, or by the gas treatment, or otherwise, as hereinbefore set forth.

When combining rosin and glycerin considerable foaming occurs when a temperature of 175-220° or so is reached and it is usually desirable to heat to about 250° C. before introducing the gas current to avoid undue foaming and to thus avoid carrying over some portion of the heated mass into the receiver.

Non-oxidizing gases such as carbon monoxid or dioxid, nitrogen, hydrogen and even the vapors of volatile hydrocarbon such as gasolene or benzol are usually to be preferred to hydrochloric acid gas as the latter often exerts a softening effect on rosin which is not desired in the harder types of varnish compositions.

Chlorin gas may be passed through solutions of rosin in a suitable solvent either to bleach the resinous material or to add or substitute chlorin. When chlorin is passed into melted rosin darkening occurs but in solution in a solvent such as carbon tetrachlorid some bleaching takes place.

A product suitable for general use is prepared by esterifying rosin to an acid number of about 1/5 the normal and then combining about 2% of lime therewith.

A varnish ester or other resin or composite resin esters or rosin anhydrid or similar product of the process herein set forth may be melted and incorporated with varnish oils such as boiled or oxidized linseed or Chinese wood oil, or perilla oil and in some cases fish or whale oils and the semi-drying oils, such as cottonseed, corn, rape and the like. When the drying features of the oils are not taken into consideration, mineral oil may be introduced more or less. The composition is made up with varying proportions of the oil and resinous material, using a larger proportion to make the long oil varnishes and smaller proportions of oil in the case of short oil varnishes. When prepared for use as a varnish where the acidity of the composition is not a factor, various acid resins or otherwise, may be incorporated with the composition. When used for grinding varnishes, the composition should be sufficiently neutral to avoid any undesirable livering and may be ground with the pigments, such as zinc oxid, white lead and the like to give a paste or composition of the consistency desired. Suitable driers and also thinners such as turpentine, benzin, benzol, toluol and the like may be introduced in the desired amount. A composition prepared from the rosin or anhydrid may be heated finally with a small amount of lime so as to contain some lime resinate, or if desired zinc resinate is incorporated with about an equal amount of Chinese wood oil and linseed oil and which has been boiled to the desired varnish making consistency and is suitably thinned with benzin, or turpentine substitute and ground with a mixture of white lead and zinc oxid and containing also some barytes or other suitable extending material to make a thick paste on the one hand or a liquid of the consistency of paint as may be desired.

What we claim is:

1. The process of making a varnish material which comprises forming the anhydrid of rosin and heating such anhydrid with glycerin under substantially ordinary atmospheric pressure; whereby the rosin ester of glycerin is obtained.

2. The process of making a varnish material which comprises forming the anhydrid of rosin and heating such anhydrid with an organic hydroxy body under substantially ordinary atmospheric pressure; whereby the rosin ester is obtained.

3. The process of making a varnish composition which comprises dehydrating rosin by heating and passing an acid gas therethrough.

4. The process of making a varnish material which comprises forming the anhydrid of rosin and heating such anhydrid with an esterifying body under substantially ordinary atmospheric pressure; whereby the rosin ester is obtained.

5. The process of making a varnish composition which comprises dehydrating rosin by heating and passing carbonic acid gas therethrough.

6. The process of making a varnish material which comprises forming the anhydrid of rosin and heating such anhydrid with glycerin to 300° C.; whereby the rosin ester of glycerin is obtained.

7. The process of making resin esters which comprises heating and agitating a mixture of resin and a body capable of esterifying therewith while contacting with these a gaseous medium capable of aiding in the esterification.

8. The process of making resin esters which comprises heating and agitating a mixture of resin and a body capable of esterifying therewith while contacting with these a non-oxidizing gaseous medium capable of aiding in the esterification.

9. The process of making an artificial varnish gum which comprises forming the anhydrid of a resin and heating such anhydrid with glycerin to 300° C.; whereby a resin ester composition is obtained.

10. The process of making resin esters which comprises heating and agitating a mixture of rosin and glycerin while contacting with these a gaseous medium capable of aiding in the esterification.

11. The process of making resin esters which comprises heating and agitating a mixture of resin and a body capable of esterifying therewith comprising glycerin while contacting with these an inert gaseous medium capable of aiding in the removal of moisture.

12. The process of making resin esters which comprises passing a dehydrating gas through the resin and a body capable of esterifying with the resin acid thereof.

13. The process of making resin esters which comprises bringing heat-modified resinous material and a body capable of esterifying therewith into intimate contact at an elevated temperature and at substantially atmospheric pressure and in maintaining such conditions until a substantial degree of esterification results.

14. The process of making rosin esters which comprises passing a dehydrating gas through heated rosin and a body capable of esterifying with the resin acid thereof.

15. The process of making resin esters which comprises bringing heat-modified resinous material and a body capable of esterifying therewith into intimate contact at about 300° C. and at substantially atmospheric pressure and in maintaining such conditions until a substantial degree of esterification results.

16. The process of making resin esters which comprises bringing resinous material and a body capable of esterifying therewith into contact at an elevated temperature and at substantially atmospheric pressure and in maintaining such conditions until at least a 75% degree of esterification results.

17. The process of making resin esters comprising rosin which comprises passing carbon dioxid gas through the resin and a body capable of esterifying with the resin acid thereof.

18. The process of making resin esters which comprises bringing resinous material and a body capable of esterifying therewith into contact with agitation at an elevated temperature and at substantially atmospheric pressure and in maintaining such conditions until a substantial degree of esterification results.

19. The process of making resin esters which comprises passing a dehydrating gas through agitated resin and a body capable of esterifying with the resin acid thereof.

20. The process of making resin esters which comprises bringing resinous material and a body capable of esterifying into violent contact at an elevated temperature and at substantially atmospheric pressure and in maintaining such conditions until a substantial degree of esterification results.

21. The process of making an artificial varnish gum which comprises forming the anhydrid of a resin and esterifying such anhydrid with glycerin substantially without exposing the material to super-atmospheric pressure.

22. The process of making varnish material which comprises heating resin to a high temperature to change its chemical constitution and esterifying under substantially atmospheric pressure with glycerin.

23. The process of making varnish material which comprises heating resin to a high temperature to change its chemical constitution and esterifying under substantially atmospheric pressure with a body capable of forming an ester therewith.

24. The process of making an artificial varnish gum which comprises forming the anhydrid of a resin, in esterifying such anhydrid with an organic hydroxy body capable of combining therewith and in allowing the water formed by such reaction to freely escape from the reaction mass.

25. The process of making an artificial varnish gum which comprises heating a resinous body to form anhydrid material, in esterifying the product with glycerin whereby water is formed and in permitting the said water to escape freely from the reaction mass during the entire period of esterification.

26. The process of making an artificial varnish gum which comprises heating a resinous body to a high temperature to change its chemical constituents, in esterifying the product with a body capable of forming an ester therewith and in permitting any moisture formed during the reaction to freely escape from the reaction mass.

27. The process of making an artificial varnish gum which comprises heating a resinous body to a high temperature to change its chemical constitution, in esterifying with glycerin and in constantly removing the moisture formed from the reaction zone.

Signed at Montclair, in the county of Essex and State of New Jersey, this 24th day of December A. D. 1914.

CARLETON ELLIS.
LOUIS RABINOVITZ.

Witnesses:
ENID CURTIS,
W. O. HENKE.